(12) United States Patent
Han et al.

(10) Patent No.: US 12,096,475 B2
(45) Date of Patent: Sep. 17, 2024

(54) APPARATUS AND METHOD FOR COORDINATED SPATIAL REUSE IN WIRELESS COMMUNICATION

(71) Applicant: SAMSUNG ELECTRONICS CO., LTD., Suwon-si (KR)

(72) Inventors: Jonghun Han, Gwacheon-si (KR); Chulho Chung, Yongin-si (KR); Myeongjin Kim, Seongnam-si (KR); Eunsung Jeon, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 204 days.

(21) Appl. No.: 17/401,567

(22) Filed: Aug. 13, 2021

(65) Prior Publication Data

US 2022/0070932 A1 Mar. 3, 2022

(30) Foreign Application Priority Data

Aug. 26, 2020 (KR) .................. 10-2020-0107973
Sep. 24, 2020 (KR) .................. 10-2020-0124192
Feb. 19, 2021 (KR) .................. 10-2021-0022600

(51) Int. Cl.
*H04W 74/0816* (2024.01)
*H04B 17/10* (2015.01)
(Continued)

(52) U.S. Cl.
CPC ...... *H04W 74/0816* (2013.01); *H04B 17/103* (2015.01); *H04W 16/14* (2013.01);
(Continued)

(58) Field of Classification Search
CPC .. H04B 17/103; H04W 16/14; H04W 52/242; H04W 52/243; H04W 72/0446
See application file for complete search history.

(56) References Cited

U.S. PATENT DOCUMENTS 8,842,657 B2  9/2014  Walton et al.
9,137,087 B2  9/2015  Nanda et al.
(Continued)

FOREIGN PATENT DOCUMENTS

KR    10-1735031    5/2017
WO    2015094379    6/2015
(Continued)

OTHER PUBLICATIONS

European Search Report dated Jan. 25, 2022 in corresponding European Patent Application No. 21192785.0 (12 pages).
(Continued)

*Primary Examiner* — James P Duffy
(74) *Attorney, Agent, or Firm* — F. CHAU & ASSOCIATES, LLC

(57) ABSTRACT

The present disclosure provides a wireless communication method. The wireless communication method may be performed by a first apparatus and may include acquiring a transmit opportunity (TXOP) for transmitting a first physical layer protocol data unit (PPDU) with a first transmission power, limiting a second transmission power of a second apparatus for sharing the TXOP with the second apparatus, and transmitting the first PPDU to a third apparatus with the transmission power in the shared TXOP.

19 Claims, 19 Drawing Sheets

(51) Int. Cl.
*H04W 16/14* (2009.01)
*H04W 52/24* (2009.01)
*H04W 72/0446* (2023.01)

(52) U.S. Cl.
CPC ....... *H04W 52/242* (2013.01); *H04W 52/243* (2013.01); *H04W 72/0446* (2013.01)

(56) References Cited

U.S. PATENT DOCUMENTS

| | | | |
|---|---|---|---|
| 9,585,171 B2 | 2/2017 | Kwon et al. | |
| 9,866,359 B2 | 1/2018 | Seok | |
| 10,820,316 B2 | 10/2020 | Zhang et al. | |
| 2011/0319084 A1* | 12/2011 | Meshkati | H04W 36/20 455/447 |
| 2020/0106579 A1* | 4/2020 | Cherian | H04L 5/0035 |
| 2021/0136679 A1* | 5/2021 | Verma | H04W 72/23 |
| 2021/0307099 A1 | 9/2021 | Ryu et al. | |
| 2023/0163808 A1* | 5/2023 | Lou | H04W 74/002 455/101 |

FOREIGN PATENT DOCUMENTS

| | | |
|---|---|---|
| WO | 2015143668 | 10/2015 |
| WO | 2020045891 | 3/2020 |

OTHER PUBLICATIONS

Han, et al., "Shared TXOP Spatial Reuse Considerations", IEEE Draft; 11-20-0590-00-00BE-Shared-Txop-Spatial-Reuse-Considerations, IEEE-SA Mentor, Piscataway, NJ USA, vol. 802.11 EHT; 802.11be May 7, 2020 (May 7, 2020), pp. 1-16, XP068167795, Retrieved from the Internet: https://mentor.ieee.org/802.11/dcn/20/11-20-0590-00-00be-shared-txop-spatial-reuse-considerations.pptx.
Park_802.11-20/0410r4 "Coordinated Spatial Reuse Procedure", 23 pages.
Seok, 802.11-20/0576r1 "Coordinated Spatial Reuse Protocol", 21 pages.
Aio, 802.11-20/0457r1 "Discussion on Coordinated Spatial Reuse Operation", 15 pages.
Akhmetov, 802.11-20/0107r1 "Multi-AP coordination for spatial reuse", 12 pages.
Liu_802.11-20/0073r0 "On Coordinated Spatial Reuse in 11be", 13 pages.

* cited by examiner

APPARATUS AND METHOD FOR COORDINATED SPATIAL REUSE IN WIRELESS COMMUNICATION

CROSS-REFERENCE TO RELATED APPLICATIONS

This application is based on and claims priority under 35 U.S.C. § 119 to Korean Patent Application No. 10-2020-0107973, filed on Aug. 26, 2020, 10-2020-0124192, Sep. 24, 2020, and 10-2021-0022600, Feb. 19, 2021 in the Korean Intellectual Property Office, the disclosures of which are incorporated by reference herein in their entirety.

BACKGROUND

The inventive concept relates to wireless communication, and in particular, to an apparatus and method for coordinated spatial reuse in wireless communication.

Wireless communication is the method of information or data transfer without the use of wired connections. For example, a wireless local area network (WLAN) is a technology for connecting two or more apparatuses to each other in a wireless signal transfer method. The WLAN technology is based on the Institute of Electrical and Electronics Engineers (IEEE) 802.11 standards. The 802.11 standards have progressed to 802.11b, 802.11a, 802.11g, 802.11n, 802.11ac, 802.11ax and the like, and supports high transmission speeds based on an orthogonal frequency-division multiplexing (OFDM) technology.

In 802.11ac, data may be simultaneously transmitted to a plurality of users through a multi-user multi-input multi-output (MU-MIMO) method. In 802.11ax, referred to as high efficiency (HE), multiple-access is implemented by adopting an orthogonal frequency-division multiple access (OFDMA) as well as the MU-MIMO method to divide and provide available subcarriers to users. Therefore, a WLAN system using 802.11ax supports communication in a congested area and outdoors.

In 802.11be, referred to as extremely high throughput (EHP), it is intended to implement support to a 6 GHz frequency band, bandwidth utilization of maximally 320 MHz per channel, adoption of hybrid automatic repeat and request (HARQ), support to maximally 16×16 MIMO, or the like. Therefore, a next-generation WLAN system is expected to effectively support low latency and ultra-high-speed transmission like new radio (NR) 5G technology. As a result, current systems are limited in efficiency. Therefore, there is a need in the art for improved throughput of the wireless communication system

SUMMARY

The inventive concept provides an apparatus and method for efficiently performing spatial reuse in wireless communication.

According to an aspect of the inventive concept, there is provided a wireless communication method performed by a first apparatus, the method including: acquiring a transmit opportunity (TXOP) for transmitting a first physical layer protocol data unit (PPDU) with a first transmission power; determining a limit for a second transmission power of a second apparatus and sharing the TXOP with the second apparatus based at least in part on the determined limit for the second transmission power; and transmitting the first PPDU to a third apparatus with the first transmission power in the shared TXOP.

According to another aspect of the inventive concept, there is provided a first apparatus for wireless communication, the first apparatus including: a transceiver; and a processing circuitry configured to: acquire a TXOP through the transceiver for transmitting a first PPDU with a first transmission power; determine a limit for a second transmission power of a second apparatus through the transceiver for sharing the TXOP with the second apparatus based at least in part on the determined limit for the second transmission power; and transmit the first PPDU to at least one third apparatus through the transceiver in the shared TXOP.

According to another aspect of the inventive concept, there is provided a wireless communication method performed by a second apparatus sharing a TXOP with a first apparatus, the method including: outputting a frame including capability information and first transmission power information, the capability information indicating support for spatial reuse and the first transmission power information indicating a first transmission power of the frame; receiving second transmission power information from the first apparatus; and transmitting a PPDU in the TXOP to at least one third apparatus with a second transmission power equal to or lower than the first transmission power indicated by the first transmission power information.

According to another aspect of the inventive concept, there is provided a wireless communication method performed by a third apparatus receiving a PPDU in a TXOP shared by a first apparatus and a second apparatus, the method including: determining a first path loss between the first apparatus and the third apparatus based on a first frame received from the first apparatus; determining a second path loss between the second apparatus and the third apparatus based on a second frame received from the second apparatus; transmitting information about the first path loss and the second path loss to the first apparatus; and receiving the PPDU in the TXOP from the first apparatus.

According to another aspect of the inventive concept, there is a method for wireless communication at a first access point, the method comprising: determining at least one path loss, the at least one path loss comprising a path loss between a first station and the first access point, a path loss between a second station and a second access point, or both; identifying a first transmission power for transmitting a first physical layer protocol data unit (PPDU) to the first station during a shared transmit opportunity (TXOP) based at least in part on the determined at least one path loss; determining a transmission power limit for transmission of a second PPDU from the second access point to the second station based at least in part on the first transmission power and the shared TXOP; transmitting an indication of the transmission power limit to the second access point; and transmitting the first PPDU with the first transmission power to the first station based at least in part on transmitting the indication of the transmission power limit to the second access point.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Figure 1:
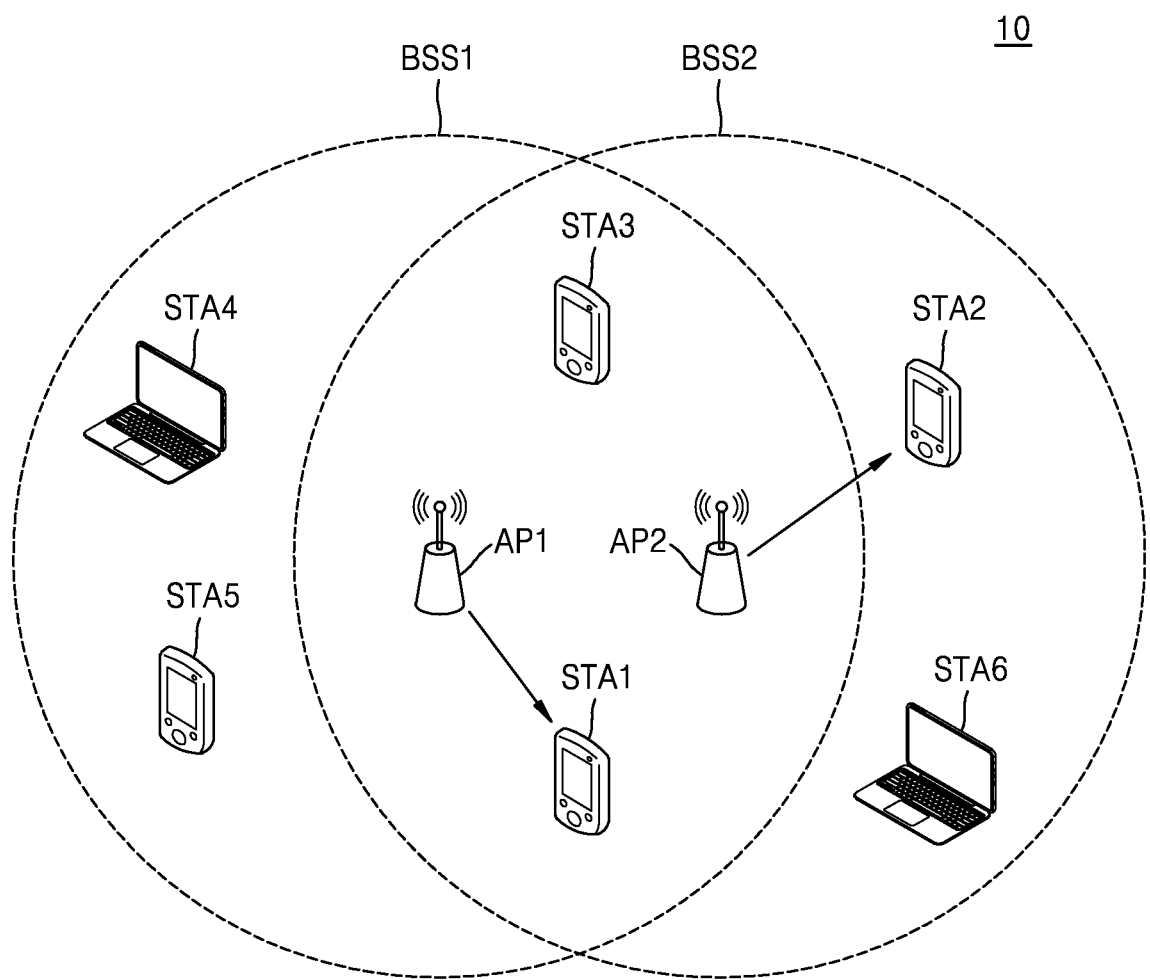
FIG. 1 is a block diagram showing a wireless communication system according to an example embodiment.

The present disclosure relates generally to wireless communication. More particularly, embodiments of the present disclosure relate to a method, apparatus, and system for coordinated spatial reuse (C-SR) in wireless communication which may improve throughput of the wireless communication system. Spatial reuse may generally include techniques for performing transmissions with transmission power levels that do not interfere with other transmissions during a shared transmit opportunity (TXOP). However, in some cases, spatial reuse may have limited efficiency based on certain transmission limitations.

According to techniques described herein, an access point (AP) acquiring a shared TXOP may calculate a transmission power allowed for a neighboring AP (e.g., a neighboring AP with an overlapping basic service set (OBSS)). For example, an AP may limit the transmission power of the neighboring AP based on some transmission power calculated by the AP. According to techniques described herein, the AP may calculate the transmission power limit allowed for the neighboring AP based on one or more determined path losses (e.g., where the path losses may be collected in advance or acquired in an arbitrary method). The AP may provide information about the maximum transmission power limit and an identifier of the neighboring AP (e.g., via an announcement frame) to the neighboring AP.

Accordingly, the AP and the neighboring AP may efficiently share a TXOP, where the AP may transmit a first PPDU to a first station in the OBSS and the neighboring AP may transmit a second PPDU to a second station based on the limited transmission power. In addition, in order to prevent interference between block acknowledgements (BAs) transmitted from the first and second stations, the AP may schedule (e.g., allocate resources for) the BAs. Alternatively, in some examples, the transmission of the BAs from the second station to the neighboring AP may be delayed by default for shared TXOPs.

Hereinafter, in specific embodiments, the following description is mainly directed to a wireless communication system based on orthogonal frequency-division multiplexing (OFDM) or orthogonal frequency-division multiplexing access (OFDMA), in particular, to the IEEE 802.11 standards. However, it should be apparent to those skilled in the art that the subject matter described herein may also be slightly changed and applied to other communication systems (e.g., cellular communication systems such as long term evolution (LTE), LTE-Advanced (LTE-A), new radio (NR), Wireless Broadband (WiBro), Global System for Mobile Communication (GSM), or the like, or short-range communication systems such as Bluetooth, Near Field Communication (NFC), or the like), which may have a similar technical background and channel format, without departing from the spirit and scope of the present disclosure.

Moreover, various functions described below may be implemented or supported by one or more computer programs, each of which is formed from computer-readable program code and embodied in a computer-readable medium. The terms "application" and "program" refer to one or more computer programs, software components, sets of instructions, procedures, functions, objects, classes, instances, related data, or a portion thereof adapted for implementation in suitable computer-readable program code. The expression "computer-readable program code" includes any type of computer code, including source code, object code, and executable code. The expression "computer-readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer-readable medium excludes wired, wireless, optical, or other communication links that transport transitory electrical or other signals. A non-transitory computer-readable medium includes media where data may be permanently stored and media where data may be stored and later overwritten, such as a rewritable optical disc or an erasable memory apparatus.

FIG. 1 is a block diagram showing a wireless communication system 10 according to an example embodiment. In some embodiments, the wireless communication system 10 may be a wireless local area network (WLAN) system.

The wireless communication system 10 may extend a service area by an access point. A station may communicate with another access point at a basic service set (BSS) provided by the access point, and be connected to a network such as the Internet, or an Internet Protocol (IP) network through the access point. For example, as shown in FIG. 1, a first access point AP1 may provide a first BSS (BSS1), and a first station STA1, a third station STA3, a fourth station STA4, and a fifth station STA5 may communicate with the first access point AP1. Additionally, or alternatively, a second access point AP2 may provide a second BSS (BSS2), and the first station STA1, a second station STA2, the third station STA3, and a sixth station STA6 may communicate with the second access point AP2.

As shown in FIG. 1, the first station STA1 and the third station STA3 may be connected to both the first access point AP1 and the second access point AP2. In FIG. 1, dashed lines respectively indicate approximate extents of the first BSS (BSS1) and the second BSS (BSS2), and may have different shapes from the circular shapes shown in FIG. 1.

An access point and a station may mutually communicate with each other using wireless fidelity (WiFi) communication or another WLAN communication technology. The access point may be referred to as a router, a gateway, or the like, and the station may be referred to as a mobile station, a subscriber station, a terminal, a mobile terminal, a wireless terminal, a user equipment, a user, or the like. The station may be a mobile apparatus such as a mobile phone, a laptop computer, a wearable apparatus, or the like, or a stationary apparatus such as a desktop computer, a smart TV, or the like. Examples of the access point and the station will be described with reference to FIG. 17.

An 802.11-based medium access control (MAC) protocol may consider simultaneous transmission of two or more signals as collision, and accordingly, access points and stations may use channels through contention. For example, the access points and the stations may mutually communicate based on carrier sense multiple access (CSMA) and/or collision avoidance (CA). Therefore, while the first access point AP1 performs transmission to the first stations STA1, the second access point AP2 may delay transmission to the third station STA3. The collision may frequently occur in an overlapping basic service set (OBSS) environment in which there are a lot of access points and stations. Therefore, the performance, for example, a throughput of the wireless communication system 10 may be limited.

In some cases, spatial reuse may enable transmissions colliding with each other to be simultaneously generated. For example, while the first access point AP1 acquiring a transmit opportunity (TXOP) performs a first transmission to the first station STA1, the second access point AP2 may perform a second transmission to the second station STA2 with a transmission power which may not interfere a reception at the first station STA1, instead of delaying the transmission to the second station STA2. Accordingly, the first transmission to the first station STA1 may be performed in parallel with the second transmission to the second station STA2, and throughput of the wireless communication system 10 may thus be increased. Herein, transmission related to an access point acquiring a TXOP may be referred to as the first transmission, and transmission related to an access point provided with a shared TXOP may be referred to as the second transmission.

In 802.11ax, an access point or a station may identify the first transmission based on a preamble, and when the first transmission is identified, may perform the second transmission that at least partially overlaps the first transmission with a transmission power determined based on a reception power of the preamble. However, the second transmission may not be considered in the first transmission. Therefore, the efficiency of spatial reuse may be limited. As will be described below with reference to the drawings, not only does the second transmission consider the first transmission in the spatial reuse (e.g., in terms of interference considerations, transmission power considerations, etc.), but the first transmission also considers the second transmission. Therefore, more efficient spatial reuse may be achieved.

In some examples, spatial reuse may rely on, or may implement, techniques based on overlapping basic service set packet detection (OBSS-PD) thresholds. In some cases, there may be a transmission (e.g., a frame) pending in an OBSS. However, if in some cases, two access points of an OBSS may share a TXOP (e.g., if there is significant SNR available in the OBSS, if path loss calculations warrant a shared TXOP, if a transmission is not very loud, etc.).

Hereinafter, in example embodiments, as shown with arrows in FIG. 1, aspects of described techniques will be provided with reference to an example that the first access point AP1 acquiring an TXOP performs the first transmission to the first station STA1, and the second access point AP2 performs the second transmission to the second station STA2 in a shared TXOP. Herein, the spatial reuse in which the first transmission of the first access point AP1 considers the second transmission of the second access point AP2 may be referred to as coordinated spatial reuse (C-SR). Additionally, or alternatively, unless otherwise indicated, the first access point AP1 performing the first transmission may be referred to as a sharing access point, or a first apparatus, and the second access point AP2 performing the second transmission may be referred to as a shared access point, or a second apparatus. Moreover, the first station STA1 receiving the first transmission from the first access point AP1 may be referred to as a third apparatus. The transmission power of the first transmission may be referred to as a first transmission power, and the transmission power of the second transmission may be referred to as a second transmission power.

Figure 2:
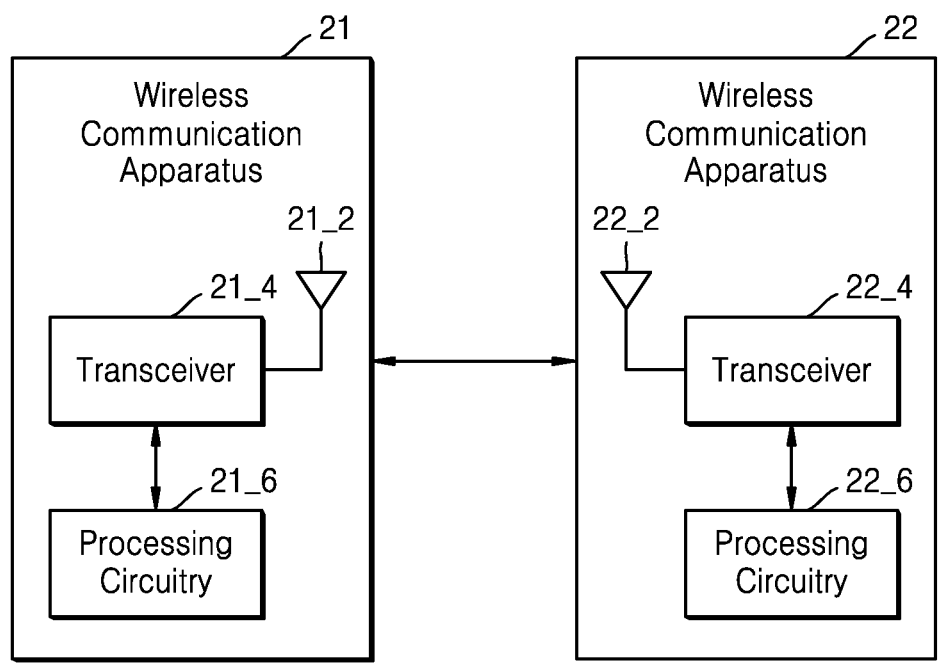
FIG. 2 is a block diagram showing a wireless communication system according to an example embodiment.

FIG. 2 is a block diagram showing a wireless communication system 20 according to an example embodiment. The block diagram of FIG. 2 shows a first wireless communication apparatus 21 and a second wireless communication apparatus 22 that communicate with each other in the wireless communication system 20. Each of the first wireless communication apparatus 21 and the second wireless communication apparatus 22 in FIG. 2 may be an arbitrary apparatus communicating in the wireless communication system 20, and may be referred to as an apparatus for wireless communication. In some embodiments, each of the first wireless communication apparatus 21 and the second wireless communication apparatus 22 may be an access point or a station of a WLAN system.

Referring to FIG. 2, the first wireless communication apparatus 21 may include an antenna 21_2, a transceiver 21_4, and processing circuitry 21_6. In some embodiments, the antenna 21_2, the transceiver 21_4, and the processing circuitry 21_6 may be included in one package, or respectively included in different packages. The second wireless communication apparatus 22 may also include an antenna 22_2, a transceiver 22_4, and a processing circuitry 22_6. Hereinafter, a repetitive description of the first wireless communication apparatus 21 and the second wireless communication apparatus 22 will be omitted.

The antenna 21_2 may receive a signal from the second communication apparatus 22 to provide the signal to the transceiver 21_4, and transmit a signal provided from the transceiver 21_4 to the second wireless communication apparatus 22. In some embodiments, the antenna 21_2 may include a plurality of antennas for multiple input multiple output (MIMO). Moreover, in some embodiments, the antenna 21_2 may include a phased array for beamforming.

The transceiver 21_4 may process a signal received through the antenna 21_2 from the second wireless communication apparatus 22, and provide the processed signal to the processing circuitry 21_6. Additionally, or alternatively, the transceiver 21_4 may process a signal provided from the processing circuitry 21_6, and output the processed signal through the antenna 21_2. In some embodiments, the transceiver 21_4 may include analog circuits such as a low noise amplifier, a mixer, a filter, a power amplifier, an oscillator, or the like. In some embodiments, the transceiver 21_4 may process the signal received from the antenna 21_2 and/or the signal received from the processing circuitry 21_6 based on a control of the processing circuitry 21_6.

The transceiver 21_4 may communicate bi-directionally, via antennas, wired, or wireless links as described above. For example, the transceiver 21_4 may represent a wireless transceiver and may communicate bi-directionally with another wireless transceiver. The transceiver 21_4 may also include or be connected to a modem to modulate the packets and provide the modulated packets to for transmission, and to demodulate received packets. In some examples, transceiver 21_4 may be tuned to operate at specified frequencies. For example, a modem can configure the transceiver 21_4 to operate at a specified frequency and power level based on the communication protocol used by the modem.

The processing circuitry 21_6 may process the signal received from the transceiver 21_4 to extract information transmitted from the second wireless communication apparatus 22. For example, the processing circuitry 21_6 may demodulate and/or decode the signal received from the transceiver 21_4 to extract the information. Moreover, the processing circuitry 21_6 may generate a signal including information intended to be transmitted to the second wireless communication apparatus 22 to provide the information to the transceiver 21_4. For example, the processing circuitry 21_6 may encode and/or modulate data intended to be transmitted to the second wireless communication apparatus 22 to provide the generated signal to the transceiver 21_4. In some embodiments, the processing circuitry 21_6 may include a programmable element such as a central processing unit (CPU) or a digital signal processor (DSP), a reconfigurable element such as a field programmable gate array (FPGA), or an element providing a fixed-function such as an intellectual property (IP) core. Herein, that the transceiver 21_4 and/or the processing circuitry 21_6 perform/performs operations may be referred to as that the first wireless communication apparatus 21 performs the corresponding operations. Accordingly, the operations to be performed by the access point may be performed by the transceiver and/or a processing circuitry included in the access point, and the operations to be performed by the station may be performed by the transceiver and/or the processing circuitry included in the station.

In some examples, processing circuitry 21_6 may be implemented by a processor. A processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor is configured to operate a memory array using a memory controller. In other cases, a memory controller is integrated into the processor. In some cases, the processor is configured to execute computer-readable instructions stored in a memory to perform various functions. In some embodiments, a processor includes special purpose components for modem processing, baseband processing, digital signal processing, or transmission processing.

In some cases, software may include code to implement aspects of the present disclosure. Software may be stored in a non-transitory computer-readable medium such as system memory or other memory. In some cases, the software may not be directly executable by the processor but may cause a computer (e.g., when compiled and executed) to perform functions described herein.

Figure 3:
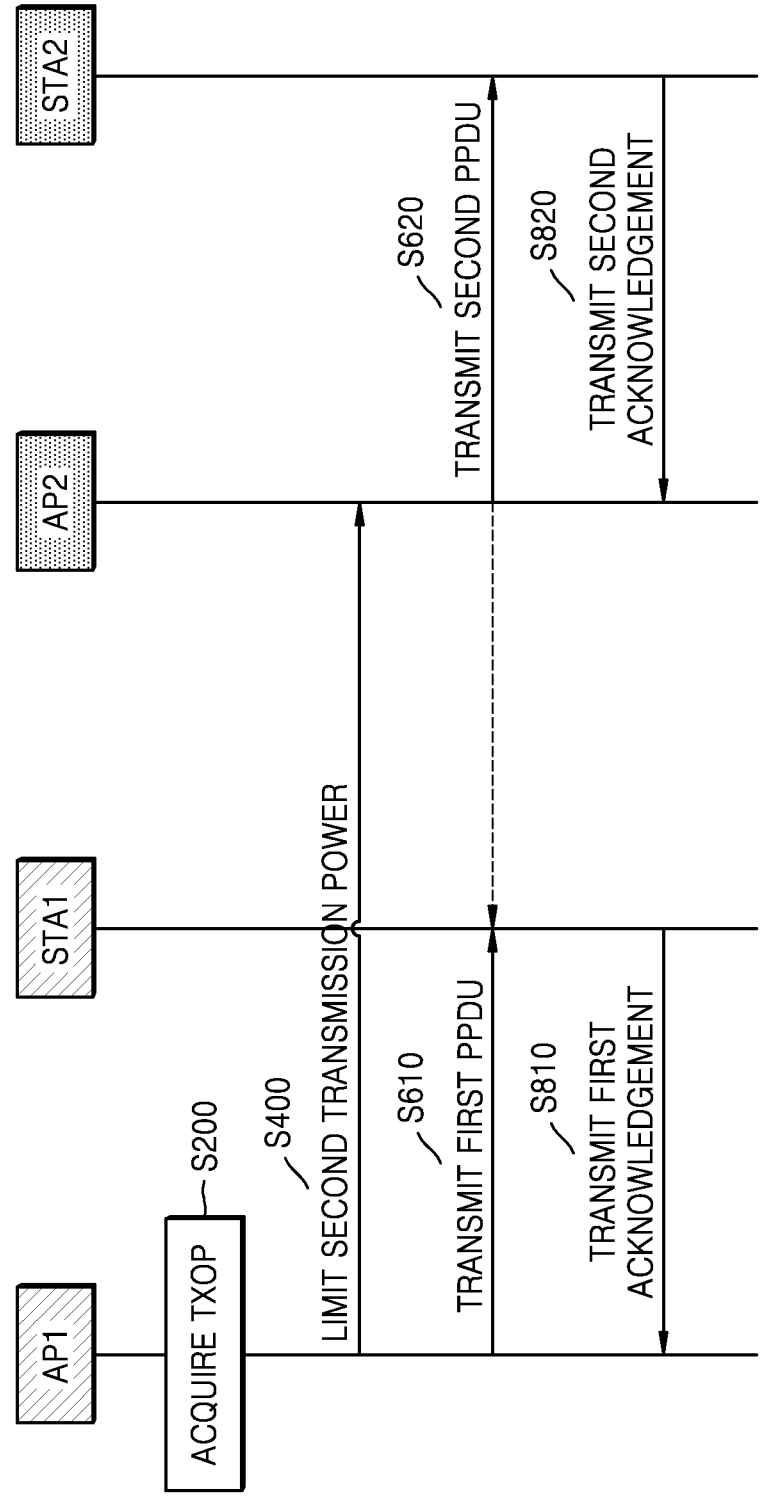
FIG. 3 is a message diagram showing a method for coordinated spatial reuse according to an example embodiment.

FIG. 3 is a message diagram showing a method for coordinated spatial reuse according to an example embodiment. As shown in FIG. 3, a method for coordinated spatial reuse may include a plurality of operations S200, S400, S610, or S620. As described above with reference to FIG. 1, the first access point AP1 in FIG. 3 may perform the first transmission to the first station STA1, and the second access point AP2 may perform the second transmission to the second station STA2.

Referring to FIG. 3, in operation S200, the first access point AP1 may acquire a TXOP. For example, the first access point AP1 may acquire the TXOP for transmitting a physical layer protocol data unit (PPDU) to the first station STA1 with a first transmission power. As described above with reference to FIG. 1, the first access point AP1 may acquire the TXOP through contention with at least one station and other access points. For spatial reuse, the TXOP acquired by the first access point AP1 may be shared with the second access point AP2. In some embodiments, different from that shown in FIG. 1, when the second access point AP2 acquires a TXOP for transmitting a second PPDU to the second station STA2, the second access point AP2 may perform the first transmission, and the first access point AP1 may also perform the second transmission.

In operation S400, the first access point AP1 may limit the second transmission power. The second transmission power may refer to a transmission power used by the second access point AP2 for transmitting the second PPDU to the second station STA2. The first access point AP1 may determine the second transmission power, and provide the second access point AP2 with information about the determined second transmission power. In some embodiments, the first access point AP1 may determine the second transmission power based on at least one path loss. Operation S400 may be included in an announcement phase of the coordinated spatial reuse, and an example thereof will be described later with reference to FIG. 8.

In operation S610, the first access point AP1 may transmit the first PPDU, and the first station STA1 may receive the first PPDU. Additionally, or alternatively, in operation S620, the second access point AP2 may transmit the second PPDU, and the second station STA2 may receive the second PPDU. For example, while the first access point AP1 may transmit the first PPDU to the first station with the first transmission power, the second access point AP2 may transmit the second PPDU to the second station STA2 with the second transmission power limited in operation S400. The radio resources used for the transmissions of the first and second PPDUs in the shared TXOP may overlap in the time domain and the frequency domain, but the interference indicated with the dashed line in FIG. 3 may be removed or reduced due to the second transmission power limited in operation S400. Accordingly, the first station STA1 may successfully receive the first PPDU from the first access point AP1, and the second station STA2 may also successfully receive the second PPDU from the second access point AP2.

In operation S810, the first station STA1 may transmit a first acknowledgement, and the first access point AP1 may receive the first acknowledgement. Additionally, or alternatively, in operation S820, the second station STA2 may transmit a second acknowledgement, and the second access point AP2 may receive the second acknowledgement. Herein, operation S610, operation S620, operation S810, and operation S820 may be included in a transmission phase of the coordinated spatial reuse. In some embodiments, the first acknowledgement and the second acknowledgement may be block acknowledgements (BAs).

Figure 4:
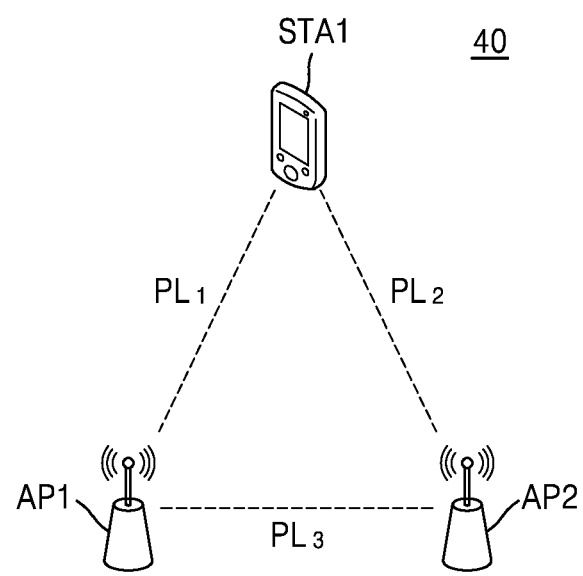
FIG. 4 is a block diagram showing a wireless communication system according to an example embodiment.

FIG. 4 is a block diagram showing a wireless communication system 40 according to an example embodiment. The block diagram of FIG. 4 shows examples of a path loss considered in the coordinated spatial reuse. As described above with reference to the drawings, the first access point AP1 may perform the first transmission to the first station STA1, and the second access point AP2 may perform the second transmission.

In some embodiments, the first access point AP1 limits the transmission power of the second access point AP2, namely, the second transmission power based on at least one path loss. For example, to determine the second transmission power, a first path loss $PL_1$ between the first access point AP1 and the first station STA1, and a second path loss $PL_2$ between the second access point AP2 and the first station STA1 may be used. As shown in FIG. 4, the first path loss $PL_1$ may correspond to a loss in a signal transmitted by the first access point AP1, and the second path loss $PL_2$ may correspond to a loss in a signal transmitted by the second access point AP2. As the first path loss $PL_1$ is lower and the second path loss $PL_2$ is higher, the first station STA1 may more successfully receive the first PPDU from the first access point AP1. Accordingly, the first access point AP1 may determine the second transmission power based on the first transmission power, the first path loss $PL_1$ and the second path loss $PL_2$. An example for determining the second transmission power by means of the first access point AP1 will be described later with reference to FIG. 8.

In some cases, path loss or path attenuation may refer to reduction or loss of power density (e.g., attenuation) of an electromagnetic wave (e.g., transmission signals) that propagate through space during transmission from a transmitting device (e.g., an AP) to a receiving device (e.g., a STA). In some cases, path loss may arise due to wireless communication environments (terrain contours, vegetation and foliage, etc.), propagation medium (dry or moist air), distances between a transmitting device and a receiving device, position (e.g. height and location) of antennas, etc. In some cases, path loss may be due to refraction, diffraction, reflection, aperture-medium coupling loss, absorption, free-space loss, etc. In some examples, as described herein, transmission power (e.g., of an AP transceiver, AP transmitter, etc.) may be determined or calculated based on identified path loss. For instance, transmission power may generally be increased in scenarios where path loss between a transmitting device and a receiving device is relatively high, and transmission power may generally be reduced in scenarios where path loss between a transmitting device and a receiving device is relatively low.

In some embodiments, the first access point AP1 may identify access points around the first access point AP1, namely, neighboring access points (or neighboring apparatuses). For example, the first access point AP1 may identify the second access point AP2 based on a signal received from the second access point AP2, and add the second access point AP2 to a candidate access point set. Additionally, or alternatively, the first access point AP1 may determine a third path loss $PL_3$ between the first access point AP1 and the second access point AP2 based on the signal received from the second access point AP2.

Figure 5:
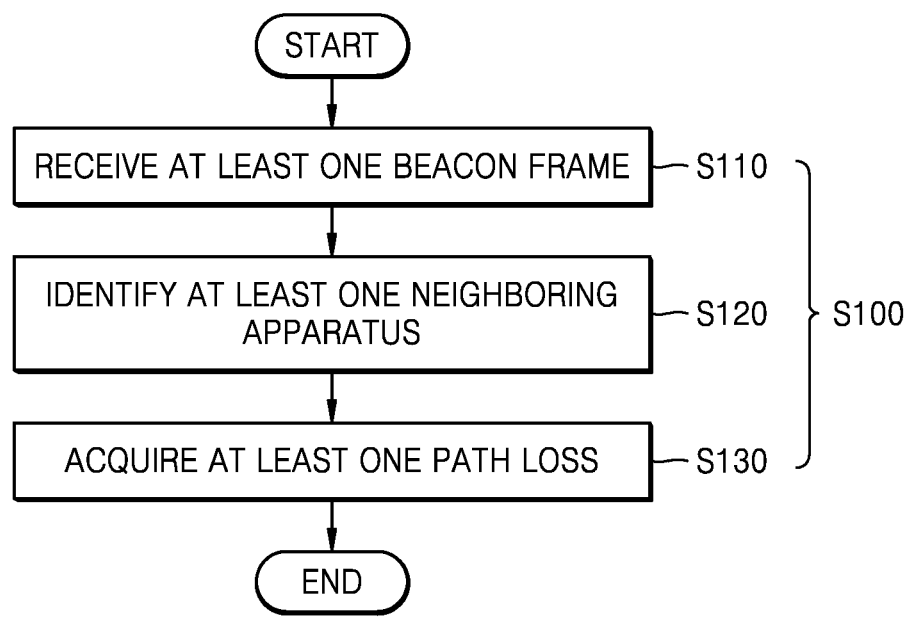
FIG. 5 is a flowchart showing a method for coordinated spatial reuse according to an example embodiment.
Figure 6:
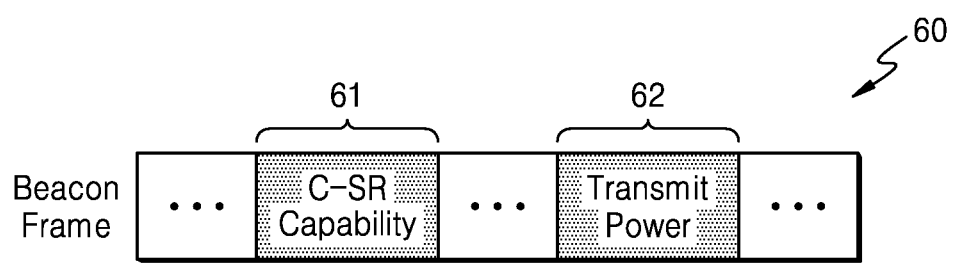
FIG. 6 illustrates a beacon frame according to an example embodiment.

FIG. 5 is a flowchart showing a method for coordinated spatial reuse according to an example embodiment, and FIG. 6 illustrates a beacon frame 60 according to an example embodiment. The flowchart of FIG. 5 illustrates operation S100 performed before the first access point AP1 performs operation S200 of FIG. 3, and the beacon frame 60 in FIG. 6 may be used in operation S100. Hereinafter, FIGS. 5 and 6 will be described with reference to FIG. 3.

Referring to FIG. 5, operation S100 may include operations S110, S120, and S130, and may be included in a preparation phase of the coordinated spatial reuse. In operation S110, the first access point AP1 may receive at least one beacon frame. For example, each of access points including the first access point AP1 and the second access point AP2 may output a beacon frame periodically or non-periodically, and the first access point AP1 may receive the beacon frame from at least one neighboring access point including the second access point AP2.

Referring to FIG. 6, the beacon frame 60 may include a plurality of fields, and each of the plurality of fields may include information. For example, as shown in FIG. 6, the beacon frame 60 may include a first field 61 including information about coordinated spatial reuse capability and a second field 62 including information about a transmission power of the beacon frame 60. For example, the first access point AP1 may extract the first field 61 from the beacon frame 60 received from the second access point AP2, and identify, based on the value of the first field 61, whether the second access point AP2 supports the coordinated spatial reuse. Additionally, or alternatively, the first access point AP1 may extract the second field 62 from the beacon frame 60, and identify, based on the value of the second field 62, the transmission power used by the second access point AP2 for transmitting the signal including the beacon frame 60. In some embodiments, the second field 62 may have the same format as a transmission power field included in a transmit power control (TPC) report. As will be described with reference to FIG. 11, the second field 62 may be used for determining a path loss.

Referring to FIG. 5 again, in operation S120, the first access point AP1 may identify at least one neighboring apparatus. For example, the first access point AP1 may identify at least one access point based on at least one beacon frame received in operation S110. The first access point AP1 may identify at least one access point capable of performing spatial reuse among at least one identified access point as at least one neighboring access point based on the value of the first field 61 included in each of the at least one beacon frame. The first access point AP1 may also be identified as a neighboring access point by a neighboring access point (e.g., AP2) receiving the beacon frame from the first access point AP1.

In operation S130, the first access point AP1 may acquire at least one path loss. The first access point AP1 may collect path losses in various manners. In some embodiments, as will be described later with reference to FIG. 10, the first access point AP1 may receive a report for the first path loss $PL_1$ and the second path loss $PL_2$ from the first station STA1. In some embodiments, the first access point AP1 may estimate the first path loss $PL_1$ and the second path loss $PL_2$ in an arbitrary manner. Additionally, or alternatively, the first access point AP1 may determine the third path loss $PL_3$ based on a frame received from the second access point AP2. An example of an operation for determining a path loss based on a received frame will be described with reference to FIG. 11. In some embodiments, operation S130 may be performed before operation S110 and operation S120 are performed, or performed in parallel with operation S110 and operation S120.

Figure 7:
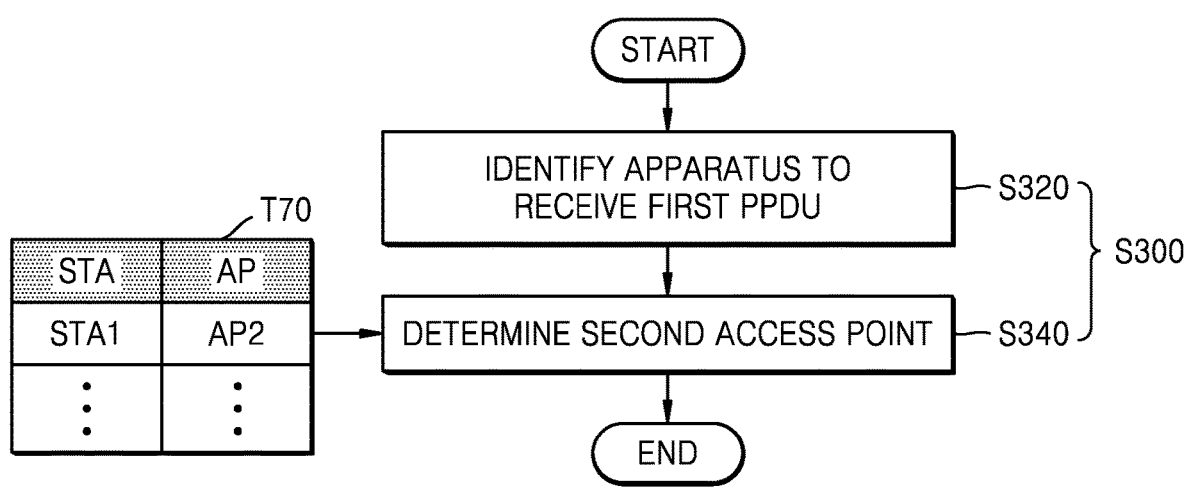
FIG. 7 is a flowchart showing a method for coordinated spatial reuse according to an example embodiment.

FIG. 7 is a flowchart showing a method for coordinated spatial reuse according to an example embodiment. The flowchart of FIG. 7 represents operation S300 in which the first access point AP1 selects the second access point for spatial reuse, namely, the second access point AP2, to share a TXOP, from among the at least one neighboring apparatus identified in operation S120 of FIG. 6. In some embodiments, operation S300 of FIG. 7 may be performed between operation S200 and operation S300 in FIG. 1. As shown in FIG. 7, operation S300 may include operation S320 and operation S340, and FIG. 7 will be described hereinafter with reference to FIG. 4.

Referring to FIG. 7, in operation S320, the first access point AP1 may identify an apparatus to receive the first PPDU. As described above with reference to FIG. 3, the first access point AP1 may acquire a TXOP to transmit the first PPDU to the first station STA1. The first access point AP1 may identify an apparatus to receive the first PPDU, namely, the first station STA1, to select an apparatus to share the TXOP.

In operation S340, the first access point AP1 may determine the second access point AP2. For example, the first access point AP1 may determine the second access point AP2 from among neighboring access points based on the first station STA1 identified in operation S320 and at least one path loss acquired in operation S130 in FIG. 5. In some embodiments, as shown in FIG. 7, before acquiring the TXOP (i.e., before performing operation S200 in FIG. 3), the first access point AP1 may construct a mapping table T70 defining shared access points, which respectively correspond to stations, based on the path losses corresponding to the stations. For example, the mapping table T70 may include, as one entry, a station and an access point used for a highest transmission power of the second transmission while the first transmission to the station is performed. The first access point AP1 may determine an apparatus identified in operation S320, namely, the second access point AP2 corresponding to the first station STA1 with reference to the mapping table T70.

In some embodiments, the first access point AP1 may determine, from among the neighboring access points, the second access point AP2 that forms a highest second path loss $PL_2$ with the first station STA1 to which the first access point AP1 intends to transmit the first PPDU. In some embodiments, the first access point AP1 may also determine the second access point AP2 that forms a highest third path loss $PL_3$ with the first access point AP1. In some embodiments, the first access point AP1 may determine the second access point AP2 based on both the second path loss $PL_2$ and the third path loss $PL_3$. In some embodiments, when the first path loss $PL_1$ is equal to or greater than a predefined threshold, the first access point AP1 may not share the TXOP with another access point for successful transmission of the first PPDU, and therefore, may not select the second access point AP2.

In some embodiments, the second access point AP2 may be selected before the TXOP is net acquired (i.e., before operation S200 of FIG. 3 is performed). In other words, the first access point AP1 may select the second access point AP2 independently from an apparatus to receive the first PPDU. For example, the first access point AP1 may select the second access point AP2 with a highest path loss with the first access point AP1 based on path losses collected before acquiring the TXOP.

Figure 8:
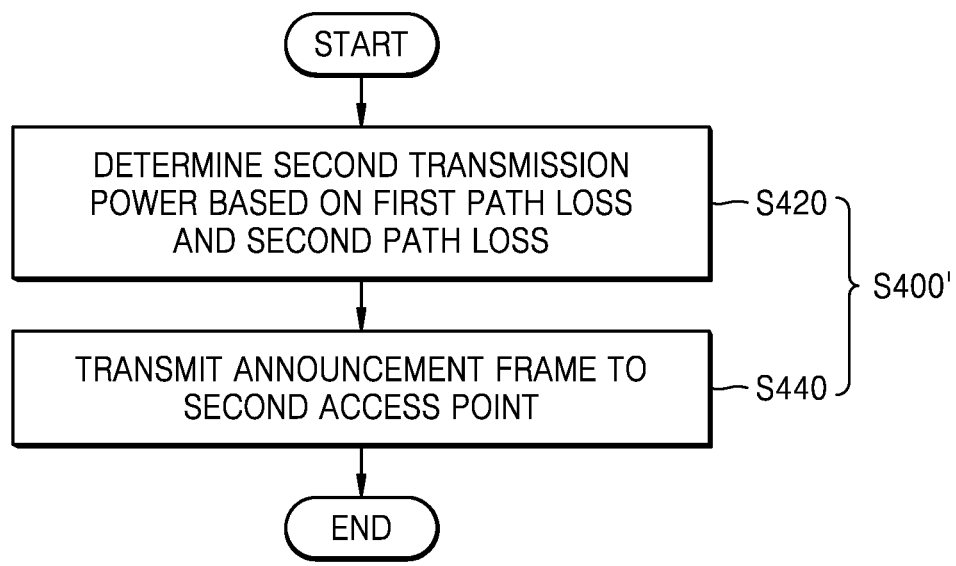
FIG. 8 is a flowchart showing a method for coordinated spatial reuse according to an example embodiment.

FIG. 8 is a flowchart showing a method for coordinated spatial reuse according to an example embodiment. The flowchart of FIG. 8 represents an example of operation S400 of FIG. 3. As described above with reference to FIG. 3, the first access point AP1 may limit the second transmission power in operation S400' of FIG. 8. As shown in FIG. 8, operation S400' may include operation S420 and operation S440. Hereinafter, FIG. 8 will be described with reference to FIG. 4.

Referring to FIG. 8, the first access point AP1 in operation S420 may determine the second transmission power based on the first path loss $PL_1$ and the second path loss $PL_2$. For example, a signal to interference ratio $SIR_1$ of the first station STA1 of FIG. 4 may be calculated as the following Equation (1).

$$SIR_1 = (P_{AP1} - PL_1) - (P_{AP2} - PL_2) \tag{1}$$

In Equation (1), $P_{AP1}$ indicates the first transmission power and $P_{AP2}$ indicates the second transmission power. On the right side of Equation (1), the first term may correspond to a reception power (may be referred to as the first reception power herein) of a signal received by the first station STA1 from the first access point AP1, and the second term may correspond to a reception power (may be referred to as the second reception power herein) of a signal received by the first station STA1 from the second access point AP2. When a minimal signal to interference ratio used by the first station STA1 for successfully receiving the first PPDU is $SIR_{th}$, $SIR_1$ of Equation (1) may be equal to or greater than $SIR_{th}$. Therefore, the maximal value $P_{AP2}^{max}$ of the second transmission power $P_{AP2}$, which satisfies $SIR_{th}$, may also satisfy the following Equation (2) ($SIR_1 = SIR_{th}$).

$$P_{AP2}^{max} \leq P_{AP1} - (PL_1 - PL_2) - SIR_{th} \tag{2}$$

In other words, the first access point AP1 may determine the second transmission power so that the difference between the first reception power of the first station STA1, which corresponds to the difference between the first transmission power and the first path loss $PL_1$, and the second reception power of the first station STA1, which corresponds to the difference between the second transmission power and the second path loss $PL_2$, is equal to or greater than a reference value (i.e., $SIR_{th}$).

In some cases, a transceiver (a transceiver 21_4) may include a power amplifier for controlling the transmission power of a transmission. For instance, a power amplifier may control or set the power of (e.g., amplify the power of) a transmission signal such as a PPDU transmission described herein. In some examples, a power amplifier may output a power-amplified transmission signal (e.g., a PPDU). In some cases, a power amplifier may amplify the power of a transmit signal to a level capable of being radiated through the antenna, to a determined limit for a transmission power for a shared TXOP, etc. In some cases, a power amplifier may be selected from various classes of amplifiers classified according to a shape of an output waveform. For example, a transmit signal (e.g., a PPDU) may be a Wi-Fi transmit signal applied to a station (e.g., STA 1, STA 2, etc.). In some examples, the Wi-Fi standard used in the mobile terminal may be at least one from the 802.11 family.

In operation S440, the first access point AP1 may transmit an announcement frame to the second access point AP2. The announcement frame may include information about the second transmission power determined in operation S420, and the second access point AP2 may identify the second transmission power based on the information about the second transmission power included in the announcement frame received from the first access point AP1. The announcement frame may include additional information used by the second access point AP2 for performing the second transmission, and an example of the announcement frame will be described below with reference to FIGS. 9A, 9B, and 14.

Figure 9A:
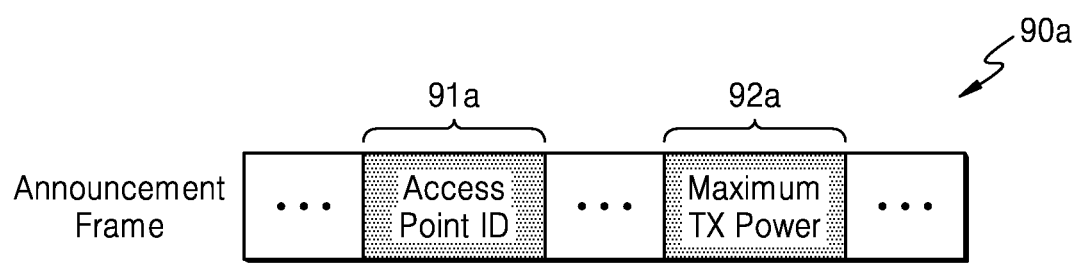
FIGS. 9A and 9B illustrate examples of an announcement frame according to example embodiments.
Figure 9B:
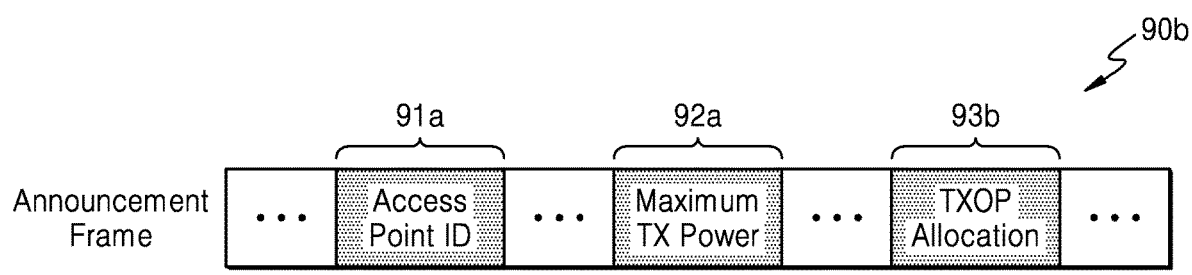

FIGS. 9A and 9B illustrate examples of the announcement frame according to example embodiments. As described above with reference to FIG. 8, the first access point AP1 may transmit an announcement frame 90a of FIG. 9A and/or an announcement frame 90b of FIG. 9B to the second access point AP2 for the coordinated spatial reuse. Hereinafter, a repetitive description of FIGS. 9A and 9B will be omitted.

Referring to FIG. 9A, the announcement frame 90a may include a plurality of fields, and each of the plurality of fields may include information. For example, as shown in FIG. 9A, the announcement frame 90a may include a first field 91a including identification information about an access point and a second field 92a including information about a maximum transmission power. For example, the second access point AP2 may extract the first field 91a from the announcement frame 90a received from the first access point AP1, and determine whether the value of the first field 91a matches identification information of the second access point AP2. Additionally, or alternatively, when the value of the first field 91a matches the identification information of the second access point AP2, the second access point AP2 may extract the second field 92a from the announcement frame 90a and identify the maximal transmission power, namely, a maximal second transmission power, based on the value of the second field 92a. In some embodiments, the second field 92a may have the same format as the transmission power field included in the TPC report.

In some embodiments, the announcement frame 90a may include a plurality of fields for a plurality of shared access points. For example, as will be described later with reference to FIG. 16, the first access point AP1 may share a TXOP with a plurality of shared access points including the second access point AP2, and transmit the announcement frame 90a including information to be provided to the plurality of shared access points. Accordingly, the announcement frame 90a may include a plurality of first fields for identification information about the plurality of shared access points, and include a plurality of second fields for maximum transmission powers of the plurality of shared access points. The second access point AP2 may identify the first field matching identification information of the second access point AP2 from among the plurality of first fields, select one of the plurality of second fields based on the identified first field (e.g., based on the order of the first fields), and identify the maximal transmission power from the selected second field.

Referring to FIG. 9B, the announcement frame 90b may include a plurality of fields, and each of the plurality of fields may include information. For example, the announcement frame 90b of FIG. 9B may include a first field 91a and a second field 92a, similar to the announcement frame 90a of FIG. 9A, and further include a third field 93b. The third field 93b may include information about the range of the TXOP to be shared by the second access point AP2. For example, the third field 93b may include information about an available bandwidth, an available frequency band, an available resource unit, or the like, and the second access point AP2 may perform the second transmission based on the value of the third field 93b. Accordingly, the first access point AP1 may share some resources of the TXOP with the second access point AP2 through the third field 93b. Additionally, or alternatively, in some embodiments, as described above with reference to FIG. 9A, the announcement frame 90b may also include a plurality of third fields corresponding to the plurality of shared access points. Therefore, the first access point AP1 may divide and allocate resources to the plurality of shared access points.

Figure 10:
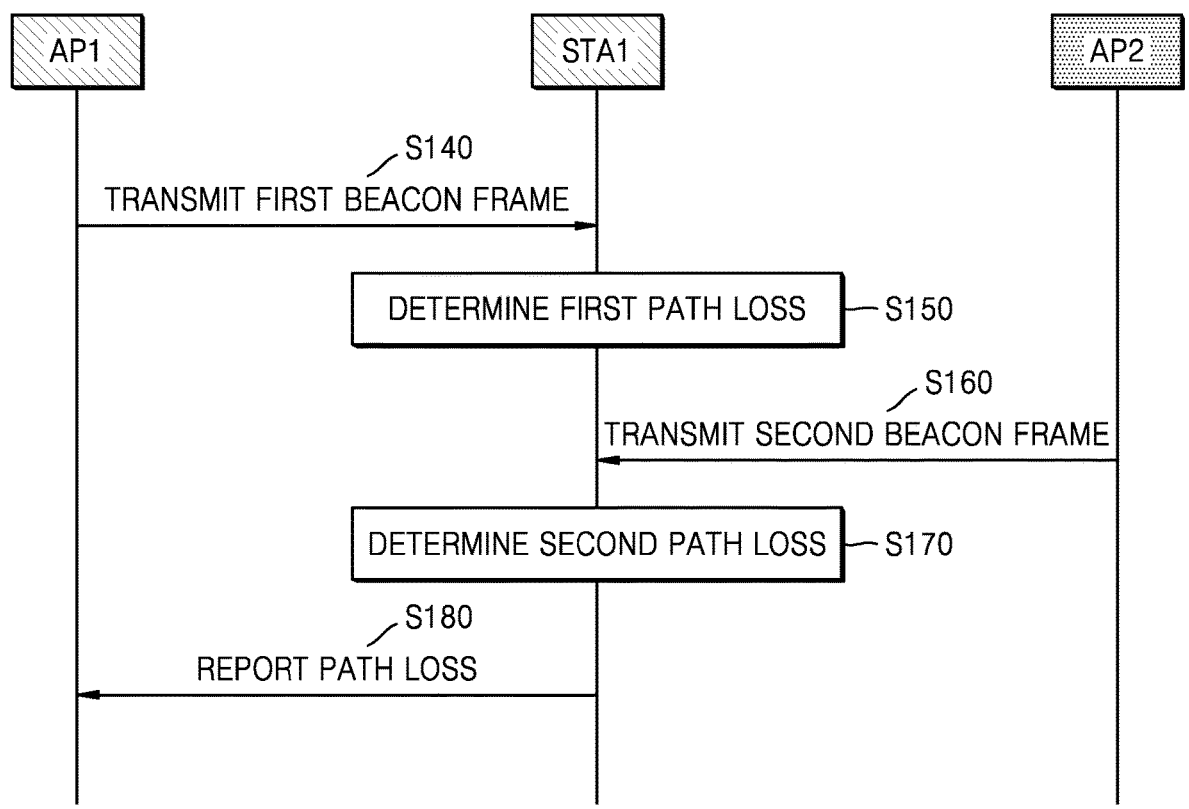
FIG. 10 is a message diagram showing a method for coordinated spatial reuse according to an example embodiment.

FIG. 10 is a message diagram showing a method for coordinated spatial reuse according to an example embodiment. The message diagram of FIG. 10 represents an example of an operation of the first access point AP1 for acquiring information about the first path loss $PL_1$ and the second path loss $PL_2$ of FIG. 4. In some embodiments, the method of FIG. 10 may be performed before performing operation S200 of FIG. 3, and included in the preparation phase of the coordinated spatial reuse. In the example of FIG. 10, a beacon frame may be used for determining a path loss, but example embodiments are not limited thereto, and an arbitrary frame transmitted by the first access point AP1 and the second access point AP2 may be used. As shown in FIG. 10, a method for the first access point AP1 to acquire information about the path loss may include a plurality of operations S140, S150, S160, S170, and S180. Hereinafter, FIG. 10 will be described with reference to FIG. 4.

Referring to FIG. 10, in operation S140, the first access point AP1 may transmit a first beacon frame, and the first station STA1 may receive the first beacon frame. As described above with reference to FIG. 6, the first beacon frame may include information (e.g., 62 of FIG. 6) about a transmission power of the first beacon frame.

In operation S150, the first station STA1 may determine the first path loss $PL_1$. As described above with reference to FIG. 4, the first path loss $PL_1$ may correspond to a path loss between the first access point AP1 and the first station STA1, and the first station STA1 may determine the first path loss $PL_1$ based on the first beacon frame received in operation S140. An example of operation S150 will be described with reference to FIG. 11.

In operation S160, the second access point AP2 may transmit a second beacon frame, and the first station STA1 may receive the second beacon frame. In operation S170, the first station STA1 may determine the second path loss $PL_2$. In some embodiments, differently from that shown in FIG. 10, operations S160 and S170 may be performed earlier than operations S140 and S150.

In operation S180, the first station STA1 may report the path loss to the first access point AP1. For example, the first station STA1 may provide, to the first access point AP1, a message including information about the first path loss $PL_1$ determined in operation S150 and the second path loss $PL_2$ determined in operation S170. Accordingly, the first access point AP1 may acquire the first path loss $PL_1$ and the second path loss $PL_2$. In some embodiments, as described above with reference to FIG. 7, the first access point AP1 may determine the second access point AP2 based on at least one of the first path loss $PL_1$, the second path loss $PL_2$, and the third path loss $PL_3$. Additionally, or alternatively, as described above with reference to FIG. 8, the first access point AP1 may determine the second transmission power based on the first path loss $PL_1$ and the second path loss $PL_2$ In some embodiments, differently from that shown in FIG. 10, the first station STA1 may report the path loss to the first access point AP1. For example, the first station STA1 may report the first path loss to the first access point AP1 after the first path loss is determined in operation S150, and report the second path loss to the second access point AP2 after the second path loss is determined in operation S170. Additionally, or alternatively, in some embodiments, in a different order from that shown in FIG. 10, the first station STA1 may determine the first path loss based on the first beacon frame, after the second path loss is determined based on the second beacon frame.

Figure 11:
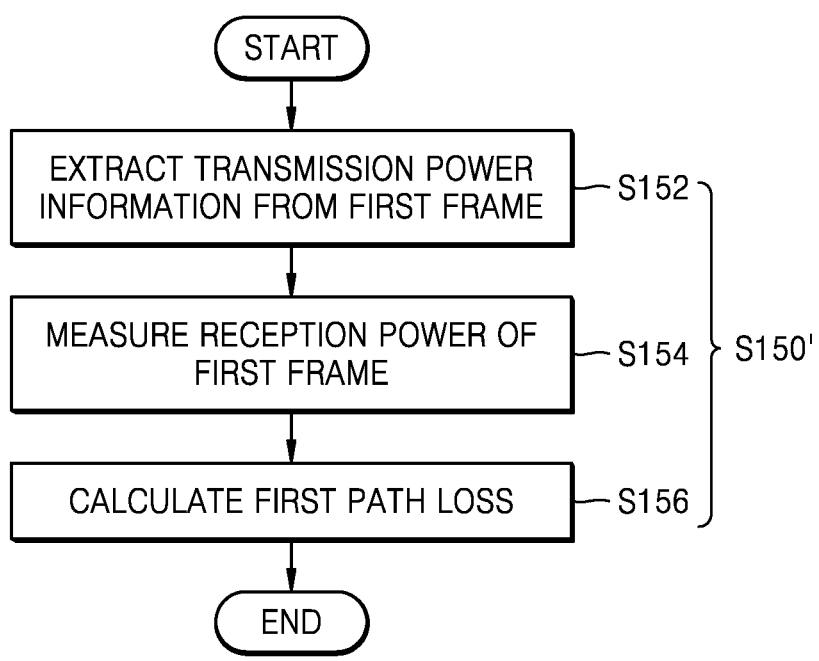
FIG. 11 is a flowchart showing a method for coordinated spatial reuse according to an example embodiment.

FIG. 11 is a flowchart showing a method for coordinated spatial reuse according to an example embodiment. The flowchart of FIG. 11 represents an example of operation S150 in FIG. 10. As described above with reference to FIG. 10, the first path loss $PL_1$ may be determined in operation S150' of FIG. 11. As shown in FIG. 11, operation S150' may include a plurality of operations S152, S154, and S156, and FIG. 11 will be described hereinafter with reference to FIG. 4.

With reference to FIG. 11, transmission power information may be extracted from a first frame in operation S152. The first frame may include a field (i.e., 62 of FIG. 6) including information about a transmission power of the first frame, and the value of the corresponding field may indicate the transmission power used by the first access point AP1 for transmitting a signal including the first frame. Accordingly, the first station STA1 may extract the corresponding field from the first frame, and identify the transmission power of the first frame based on the value of the extracted field. The first frame may be a beacon frame as described above with reference to FIG. 6, or another arbitrary frame (e.g., a trigger frame).

In operation S154, the transmission power of the first frame may be measured. For example, the first station STA1 may measure the power of the signal that includes the first frame and is received from the first access point AP1. In some embodiments, the reception power of the signal including the first frame may be measured by a power detector included in the transceiver (e.g., 21_4 of FIG. 2).

In operation S156, the first path loss $PL_1$ may be calculated. For example, the first station STA1 may calculate the first path loss $PL_1$ as the difference between the transmission power identified in operation S152 and the reception power measured in operation S154. In some embodiments, the first station STA1 in operation S160 of FIG. 10 may determine the second path loss $PL_2$ based on the second frame in a manner similar to that described above. Additionally, or alternatively, in some embodiments, the first access point AP1 may determine the third path loss $PL_3$ based on the second frame in a manner similar to that described above.

Figure 12:
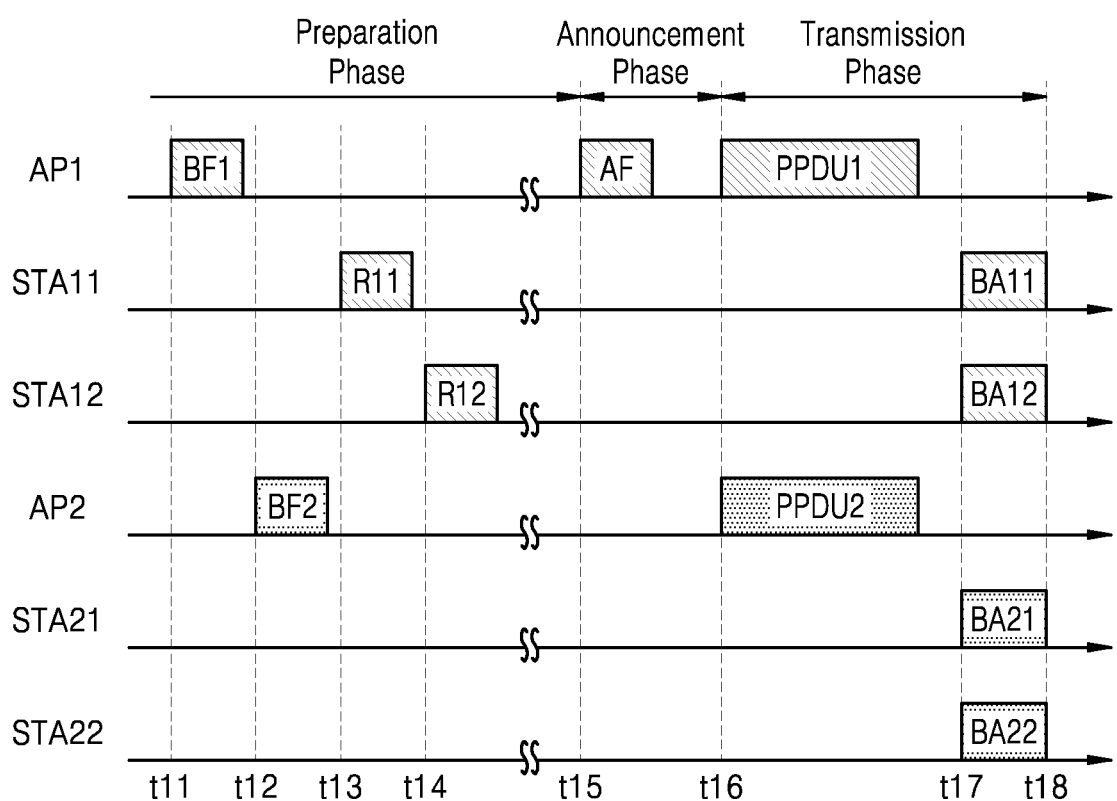
FIG. 12 is a timing diagram showing transmission based on coordinated spatial reuse according to an example embodiment.

FIG. 12 is a timing diagram showing transmission based on the coordinated spatial reuse according to an example embodiment. The timing diagram of FIG. 12 represents an example of multi-user (MU) downlink (DL) transmission that the first access point AP1, which may be a sharing access point, transmits the first PPDU PPDU1 to first stations STA11 and STA12, and the second access point AP2, which may be a shared access point, transmits the second PPDU PPDU2 to second access stations STA21 and STA22.

Referring to FIG. 12, at time t11, the first access point AP1 may transmit a first beacon frame BF1, and at time t12, the second access point AP2 may transmit a second beacon frame BF2. As described above with reference to FIG. 6, the first beacon frame BF1 may include identification information about the first access point AP1 and information about a transmission power used for transmitting the first beacon frame BF1, and the second beacon frame BF2 may include identification information about the second access point AP2 and information about a transmission power used for transmitting the second beacon frame BF2. In some embodiments, the second beacon frame BF2 may be transmitted earlier than the first beacon frame BF1, or the first and second beacon frames BF1 and BF2 may be simultaneously transmitted.

At time t13, the first station STA11 may report path losses to the first access point AP1. For example, the first station STA11 may determine a path loss between the first access point AP1 and the first station STA11 based on the first beacon frame BF1, and determine a path loss between the second access point AP2 and the first station STA11 based on the second beacon frame BF2. The first station STA11 may transmit a message including the determined path losses to the first access point AP1.

At time t14, the first station STA12 may report path losses to the first access point AP1. For example, the first station STA12 may determine a path loss between the first access point AP1 and the first station STA12 based on the first beacon frame BF1, and determine a path loss between the second access point AP2 and the first station STA12 based on the second beacon frame BF2. The first station STA12 may transmit a message including the determined path losses to the first access point AP1.

At time t15, the first access point AP1 may transmit an announcement frame AF to the second access point AP2. For example, the first access point AP1 may acquire a TXOP for transmitting the first PPDU PPDU1 to the first stations STA11 and STA12. As described above with reference to FIGS. 9A and 9B, the announcement frame AF may include the identification information about the access point AP2 and the information about the maximal transmission power. As shown in FIG. 12, a period to time t15, namely, a period before the first access point AP1 transmits the announcement frame AF (or a period before a TXOP is acquired) may be referred to as the preparation phase. Additionally, or alternatively, a period from time t15 to time t16, which includes a period in which the announcement frame AF is transmitted, may be referred to as the announcement phase.

In some embodiments, differently from that shown in FIG. 12, the second access point AP2 in the announcement phase may transmit an acknowledgement ACK to the first access point AP1 in response to the announcement frame AF. Accordingly, the first access point AP1 may identify, based on the acknowledgement ACK received from the second access point AP2, that information included in the announcement frame AF is successfully delivered to the second access point AP2, and enter a transmission phase to be described later.

At time t16, the first access point AP1 may transmit the first PPDU PPDU1 to the first stations STA11 and STA12, and the second access point AP2 may transmit the second PPDU PPDU2 to the second stations STA21 and STA22. The first access point AP1 may transmit the first PPDU PPDU1 in the shared TXOP with the first transmission power, and may transmit the second PPDU PPDU2 in the shared TXOP with the second transmission power limited to the maximal transmission power identified based on the announcement frame.

At time t17, the first stations STA11 and STA12 may respectively transmit first acknowledgements BA11 and BA12 to the first access point AP1, and the second stations STA21 and STA22 may respectively transmit second acknowledgements BA21 and BA22 to the second access point AP2. As shown in FIG. 12, a period from time t16 to time t18, in which the first PPDU PPDU1 and the second PPDU PPDU2 are transmitted in the shared TXOP and the first acknowledgements BA11 and BA12 and the second acknowledgements BA21 and BA22 are transmitted, may be referred to as the transmission phase.

As described above, the first access point AP1 may limit the second transmission power of the second access point AP2, namely, the transmission power to be used for transmitting the second PPDU PPDU2, but the transmission power of the second stations STA21 and STA22, namely, the transmission power to be used for transmitting the second acknowledgements BA21 and BA22, may not be limited. Accordingly, as shown in FIG. 12, when the first acknowledgements BA11 and BA12 and the second acknowledgements BA21 and BA22 are simultaneously transmitted between time t17 and time t18, interference may occur. Embodiments for preventing the interference between the first acknowledgements BA11 and BA12 and the second acknowledgements BA21 and BA22 will be described with reference to FIGS. 13 to 16.

Figure 13:
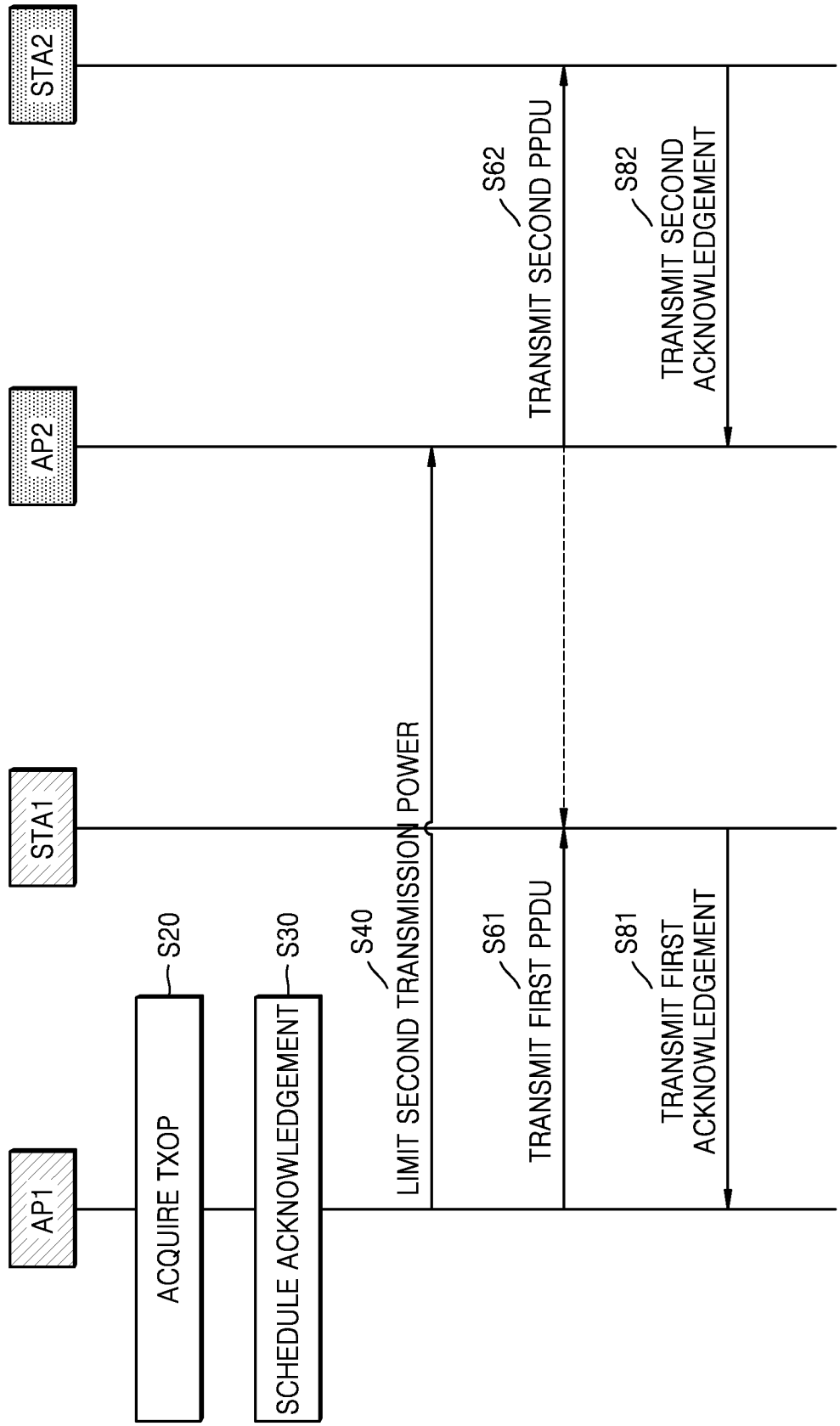
FIG. 13 is a message diagram showing a method for coordinated spatial reuse according to an example embodiment.

FIG. 13 is a message diagram showing a method for coordinated spatial reuse according to an example embodiment. As shown in FIG. 13, the method for coordinated spatial reuse may include a plurality of operations S20, S30, S40, S30, S40, S81, or S82. In comparison with the method of FIG. 3, the method of FIG. 13 may further include operation S30. Hereinafter, in describing FIG. 13, a repetitive description of FIG. 3 will be omitted.

Referring to FIG. 13, in operation S20, the first access point AP1 may acquire a TXOP. For example, the first access point AP1 may acquire the TXOP for transmitting the first PPDU to the first station STA1.

In operation S30, the first access point AP1 may schedule acknowledgements. As described above with reference to FIG. 12, to prevent the interference between the first acknowledgement transmitted by the first station STA1 to the first access point AP1 and the second acknowledgement transmitted by the second station STA2 to the second access point AP2, the first access point AP1 may schedule the first acknowledgement and the second acknowledgement such that the second acknowledgement is allocated to radio resources that do not overlap those to which the first acknowledgement is allocated. The first access point AP1 may provide the allocation information about the first acknowledgement to the first station STA1, and the allocation information about the second acknowledgement to the second access point AP2. The allocation information about the second acknowledgement may be provided to the second access point AP2 in various ways. For example, as will be described with reference to FIG. 14, the first access point AP1 may provide the second access point AP2 with the announcement frame including the allocation information about the acknowledgement, or a control subfield including the allocation information about the acknowledgement together with the announcement frame.

In operation S40, the first access point AP1 may limit the second transmission power. For example, the first access point AP1 may limit the transmission power to be used by the second access point AP2 for transmitting the second PPDU, namely, the second transmission power. In operation S61, the first access point AP1 may transmit the first PPDU to the first station STA1, and in operation S62, the second access point AP2 may transmit the second PPDU to the second station STA2. The second access point AP2 may transmit the second PPDU with the second transmission power limited in operation S40. The first PPDU may include the allocation information about the first acknowledgement, which may be generated in operation S30, and the second PPDU may include the allocation information about the second acknowledgement, which may be generated in operation S30. In operation S81, the first station STA1 may transmit the first acknowledgement to the first access point AP1, and in operation S82, the second station STA2 may transmit the second acknowledgement to the second access point AP2. The first station STA1 may transmit the first acknowledgement to the first access point AP1 based on the allocation information about the first acknowledgement, which may be included in the first PPDU, and the second station STA2 may transmit the second acknowledgement to the second access point AP2 based on the allocation information about the second acknowledgement, which may be included in the second PPDU. Consequently, the interference between the first acknowledgement and the second acknowledgement may be removed.

Figure 14:
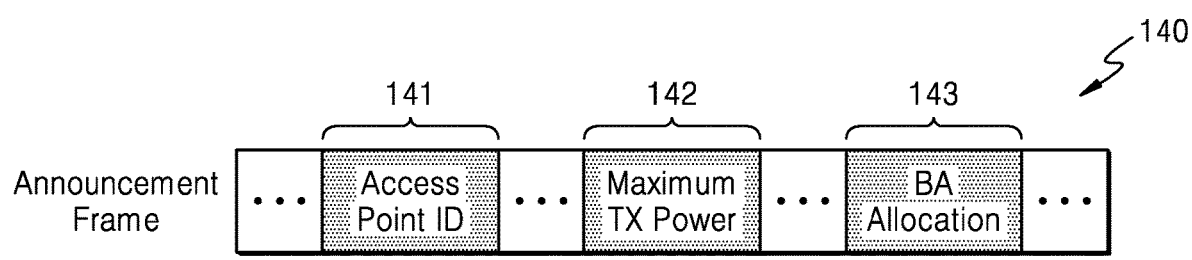
FIG. 14 illustrates an announcement frame according to an example embodiment.

FIG. 14 illustrates an announcement frame 140 according to an example embodiment. In some embodiments, the first access point AP1 of FIG. 13 may transmit the announcement frame 140 of FIG. 14 to the second access point AP2 to limit the second transmission power, and schedule the second acknowledgement. Hereinafter, FIG. 14 will be described with reference to FIG. 13.

Referring to FIG. 14, the announcement frame 140 may include a plurality of fields, and each of the plurality of fields may include information. For example, as illustrated in FIG. 14, similar to the announcement frame 90a of FIG. 9A, the announcement frame 140 may include a first field 141 including identification information about an access point, and a second field 142 including information about a maximum transmission power, and may further include a third field 143 including allocation information about an acknowledgement.

The third field 143 may include information about radio resources to which the second acknowledgement received by the second access point AP2 (i.e., the shared access point) in response to the second PPDU is allocated. In some embodiments, as will be described below with reference to FIG. 15A, the third field 143 may include information about a frequency band to which the second acknowledgement is allocated. Additionally, or alternatively, in some embodiments, as will be described below with reference to FIG. 15B, the third field 143 may also include information about a time band to which the second acknowledgement is allocated. The second access point AP2 may identify radio resources to which the second acknowledgement is allocated based on the value of the third field 143, and provide, to the second station STA2, the allocation information about the second acknowledgment, such as the information about the radio resources to which the second acknowledgement is allocated.

In some embodiments, the allocation information about the acknowledgment may be included in an HT control field of 802.11. For example, the first access point AP1 may generate the HT control field including the information about the radio resources to which the second acknowledgement is allocated, and transmit the HT control field together with an announcement frame, for example, the HT control field attached to the announcement frame, to the second access point AP2.

In some embodiments, the third field 143 may include the value indicating whether the allocation of the acknowledgements to the radio resources is activated. For example, when the third field 143 has a predefined first value, the shared access point may identify that there are no radio resources to which the acknowledgements are separately allocated, and may transmit the acknowledgements in the shared TXOP. In some embodiments, as described above with reference to FIG. 9B, when the announcement frame 140 includes a field (e.g., 93b of FIG. 9B) indicating information about the range of the shared TXOP, the shared access point may transmit the acknowledgement within the range of the TXOP in response to the first value of the third field 143.

Figure 15A:
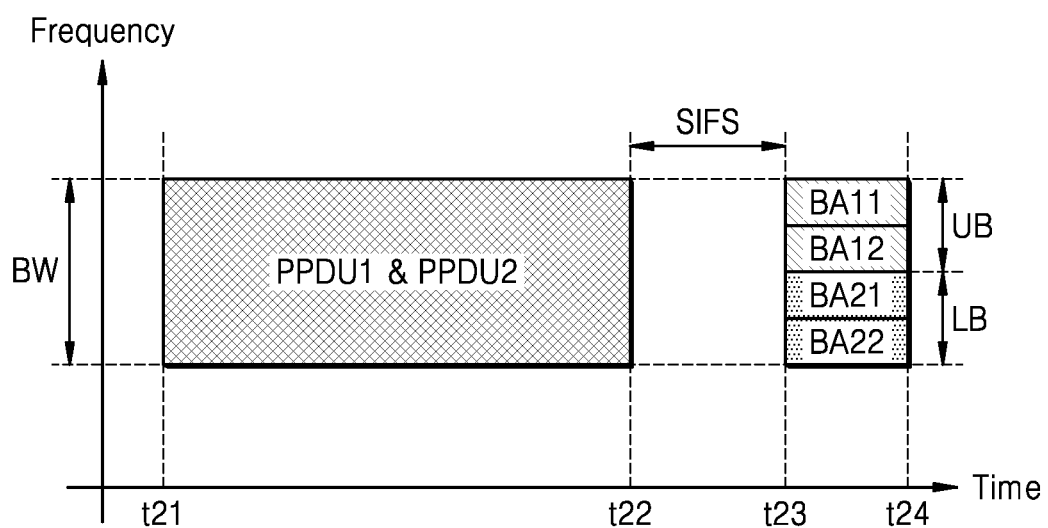
FIGS. 15A and 15B are timing diagrams showing examples of transmission based on coordinated spatial reuse according to example embodiments.
Figure 15B:
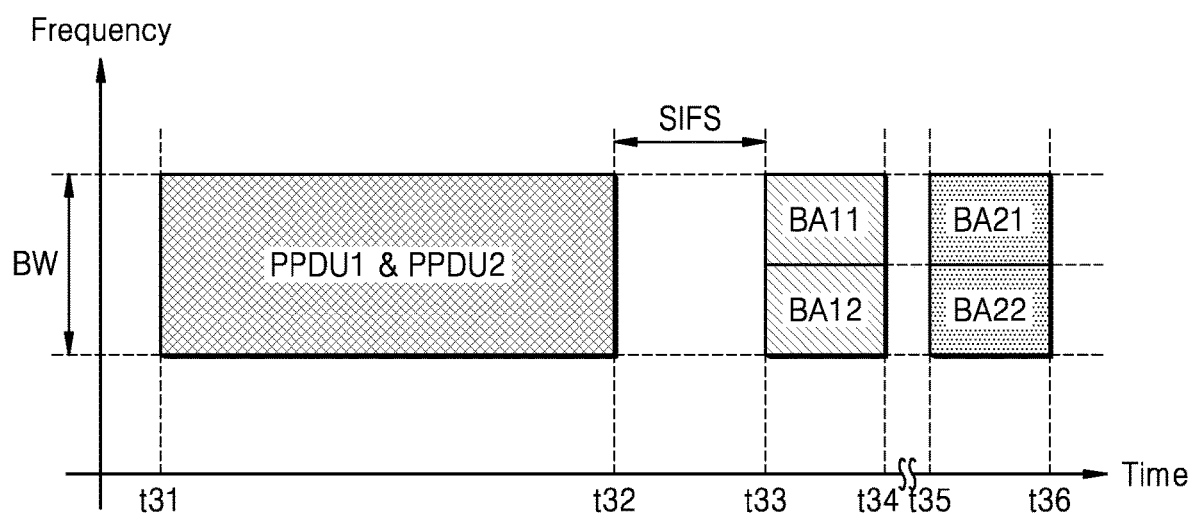

FIGS. 15A and 15B are timing diagrams showing examples of transmission based on coordinated spatial reuse according to example embodiments. The timing diagrams of FIGS. 15A and 15B indicate examples of at the transmission phase of the coordinated spatial reuse in a wireless communication system including the first access point AP1, the first stations STA11 and STA12, the second access point AP2, and the second stations STA21 and STA22 as the example of FIG. 12. Hereinafter, FIGS. 15A and 15B will be described with reference to FIG. 12, and a repetitive description about FIGS. 15A and 15B will be omitted.

With reference to FIG. 15A, the first PPDU PPDU1 and the second PPDU PPDU2 may be transmitted between time t21 and time t22. As shown in FIG. 15A, the first PPDU PPDU1 and the second PPDU PPDU2 may be transmitted within a shared bandwidth BW. For example, each of the first PPDU PPDU1 and the second PPDU PPDU2 may be allocated to an arbitrary resource unit within the bandwidth BW. In some embodiments, the bandwidth may correspond to one of 20 MHz, 40 MHz, 80 MHz, 160 MHz, and 320 MHz.

The first acknowledgements BA11 and BA12 and the second acknowledgements BA21 and BA22 may be transmitted at time t23 and time t24. As shown in FIG. 15A, the first acknowledgements BA11 and BA12 and the second acknowledgements BA21 and BA22 may be transmitted from time t23 at which a short inter-frame space (SIFS) elapses from time t22. To prevent the interference between the first acknowledgements BA11 and BA12 and the second acknowledgements BA21 and BA22, the first access point AP1 may allocate the first acknowledgements BA11 and BA12 to an upper band UB of the bandwidth BW, and the second acknowledgements BA21 and BA22 to a lower band LB of the bandwidth BW. Accordingly, the first stations STA11 and STA12 may transmit the first acknowledgements BA11 and BA12 to the first access point AP1 through resource units included in the upper band UB of the bandwidth BW, and the second stations STA21 and STA22 may transmit the second acknowledgements BA21 and BA22 to the second access point AP2 through resource units included in the lower band LB of the bandwidth BW.

In some embodiments, the access point may allocate the acknowledgements to different radio resources in a multi-user MU environment. For example, as shown in FIG. 15A, the first access point AP1 may allocate the first acknowledgements BA11 and BA12 to respective different bands within the upper band UB. Additionally, or alternatively, the first access point AP2 may allocate the second acknowledgements BA21 and BA22 to respective different bands within the lower band LB.

With reference to FIG. 15B, the first PPDU PPDU1 and the second PPDU PPDU2 may be transmitted between time t31 and time t32. As shown in FIG. 15B, the first PPDU PPDU1 and the second PPDU PPDU2 may be transmitted within the shared bandwidth BW.

The first acknowledgements BA11 and BA12 may be transmitted between time t33 and time t34. In some embodiments, the first stations STA11 and STA12 may transmit the first acknowledgements BA11 and BA12 to the first access point AP1 between time t33 and time t34 based on the allocation information about the first acknowledgements BA11 and BA12 provided from the first access point AP1. In some embodiments, the first access point AP1 may not provide the allocation information about the first acknowledgements BA11 and BA12 to the first stations STA11 and STA12, and the first stations STA11 and STA12 may transmit the first acknowledgements BA11 and BA12 to the first access point AP1 between time t33 and time t34 based on a default setting after an SIFS elapses from t32.

The second acknowledgements BA21 and BA22 may be transmitted between time t35 and time t36. In some embodiments, the second access point AP2 may identify a delayed transmission of the second acknowledgements BA21 and BA22 based on the allocation information about the second acknowledgements BA21 and BA22 included in the announcement frame, and provide the delayed second acknowledgements BA21 and BA22 to the second stations STA21 and STA22. In some embodiments, when the shared access point is identified based on the identification information included in the announcement frame, the second access point AP2 may provide the second stations STA21 and STA22 with information for delaying the second acknowledgements BA21 and BA22. Therefore, the allocation information (e.g., 143 of FIG. 14) about the second acknowledgements BA21 and BA22 may be omitted.

Figure 16:
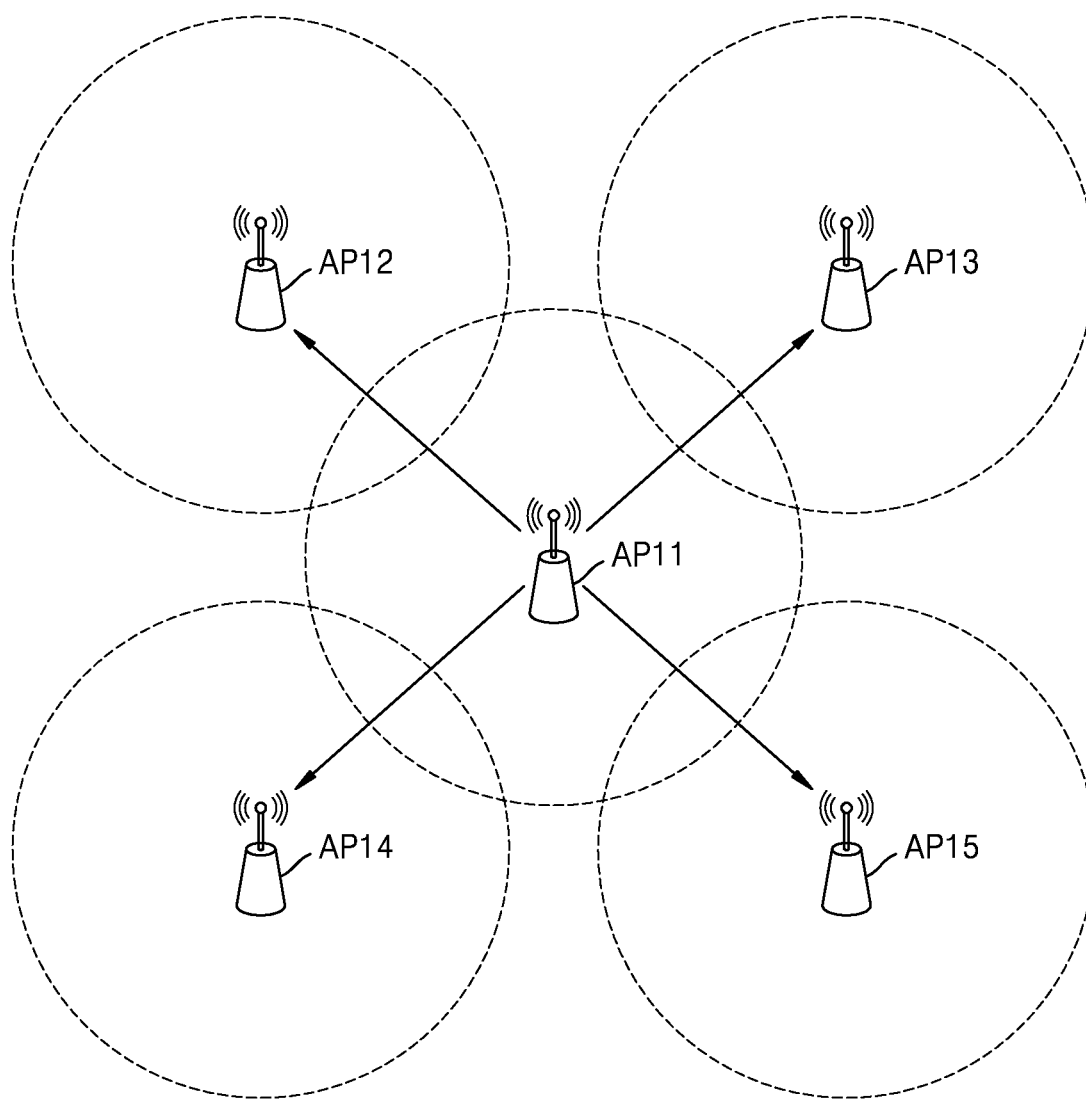
FIG. 16 is a block diagram showing a wireless communication system according to an example embodiment.

FIG. 16 is a block diagram showing a wireless communication system 160 according to an example embodiment. As shown in FIG. 16, the wireless communication system 160 may include first to fifth access points AP11 to AP15.

In some embodiments, a sharing access point may share a TXOP with a plurality of shared access points. For example, when acquiring the TXOP for transmitting a PPDU, the first access point AP11 may share the TXOP with the second to fifth access points AP12 to AP15 among neighboring access points. Therefore, the first access point AP11 may determine transmission powers of the second to fifth access points AP12 to AP15 based on at least one path loss, and transmit an announcement frame including information about the determined transmission powers to the second to fifth access points AP12 to AP15. Each of the second to fifth access points AP12 to AP15 may transmit the PPDU with a transmission power limited based on the information about the transmission power included in the announcement frame, and consequently, the efficiency of the wireless communication system 160 may remarkably increase.

In some embodiments, the sharing access point may allocate radio resources to be used for transmissions of the plurality of shared access points. For example, when acquiring the TXOP for transmitting the PPDU, the first access point AP11 may allocate an upper band of a bandwidth to the second and fifth access points AP12 and AP15, and allocate a lower band of the bandwidth to the third and fourth access points AP13 and AP14. Therefore, the first access point AP11 may transmit resource allocation information, namely, an announcement frame including the allocation information about bands, and each of the second to fifth access points AP12 to AP15 may identify the band based on the allocation information about the bands included in the announcement frame, and transmit the PPDU to at least one station within the identified band.

Figure 17:
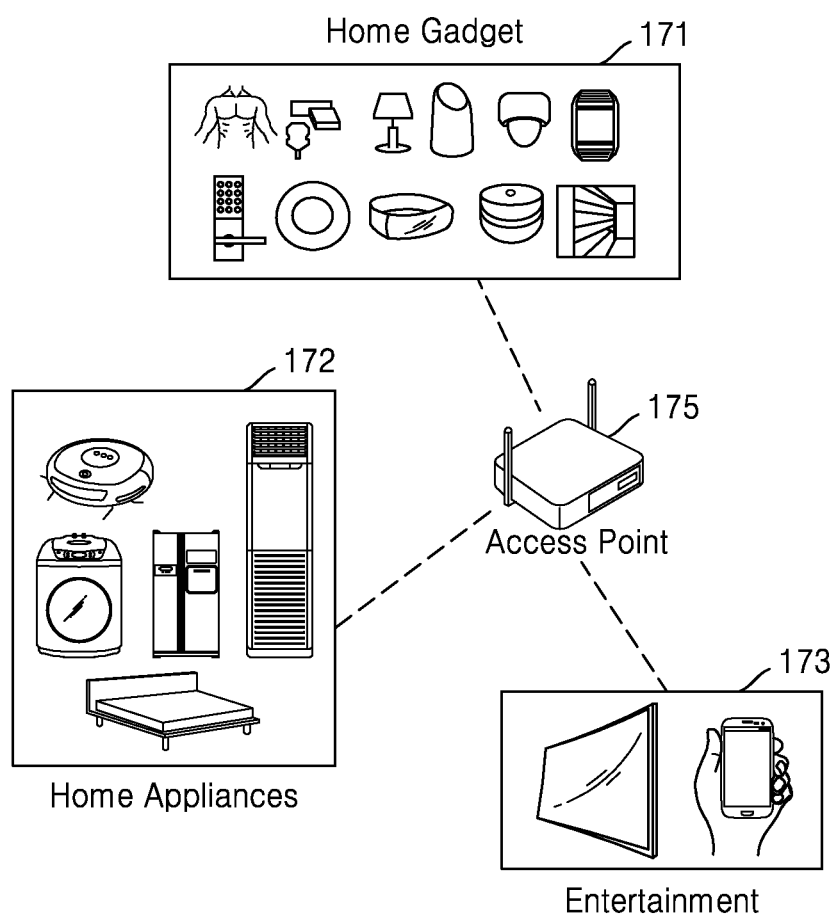
FIG. 17 illustrates examples of an apparatus for wireless communication according to an example embodiment.

FIG. 17 illustrates examples of an apparatus for wireless communication according to an example embodiment. FIG. 17 represents an Internet of Things (IoT) network system including a home gadget 171, home appliances 172, an entertainment device 173, and an access point 175.

In some embodiments, in an apparatus for wireless communication of FIG. 13, a method for coordinated spatial reuse described above with reference to the drawings may be performed. For example, the access point 175 (i.e., a sharing access point) acquiring a TXOP may share the TXOP with the neighboring access points (i.e., shared access points), and transmit a PPDU in the shared TXOP to the home gadget 171, the home appliances 172, and the entertainment device 173. In some embodiments, the home gadget 171, the home appliances 172, and/or the entertainment device 173 may report at least one path loss to the access point 175, and the access point 175 may limit transmission powers of the neighboring access points in the shared TXOP based on the at least one path loss. Accordingly, the home gadget 171, the home appliances 172, and/or the entertainment device 173 may successfully receive the PPDU, and the neighboring access points may not delay the transmission of the PPDU. Consequently, the efficiency of the IoT network system may increase.

While the inventive concept has been particularly shown and described with reference to embodiments thereof, it will be understood that various changes in form and details may be made therein without departing from the spirit and scope of the following claims.

What is claimed is:

1. A wireless communication method performed by a first apparatus, the method comprising:
   acquiring, by the first apparatus, a transmit opportunity (TXOP) for transmitting a first physical layer protocol data unit (PPDU) with a first transmission power;
   selecting, by the first apparatus, a second apparatus for sharing the TXOP to a third apparatus based on a path loss between the first apparatus and the second apparatus;
   determining, by the first apparatus, a limit for a second transmission power of the second apparatus and sharing the TXOP with the second apparatus based at least in part on the determined limit for the second transmission power; and
   transmitting, by the first apparatus, the first PPDU to the third apparatus with the first transmission power in the shared TXOP.

2. The wireless communication method of claim 1, further comprising:
   receiving at least one frame;
   identifying at least one neighboring apparatus configured to support spatial reuse based on the at least one frame; and
   determining at least one path loss.

3. The wireless communication method of claim 2, further comprising:
   selecting the second apparatus from among the at least one neighboring apparatus, wherein the selecting the second apparatus comprises:
   identifying the third apparatus; and
   selecting the second apparatus based on the identified third apparatus and the at least one path loss.

4. The wireless communication method of claim 1, wherein determining the limit for the second transmission power comprises determining the second transmission power based on a first path loss and a second path loss, the first path loss comprising a path loss between the first apparatus and the third apparatus and the second path loss comprising a path loss between the second apparatus and the third apparatus.

5. The wireless communication method of claim 4, wherein determining the second transmission power comprises calculating the second transmission power based on a difference between a first reception power of the third apparatus and a second reception power of the third apparatus being equal to or greater than a reference value, wherein the first reception power corresponds to a difference between the first transmission power and the first path loss, and wherein the second reception power corresponds to a difference between the second transmission power and the second path loss.

6. The wireless communication method of claim 4, wherein determining the limit for the second transmission power further comprises transmitting, to the second apparatus, apparatus identification information including an identifier of the second apparatus and information about the second transmission power.

7. The wireless communication method of claim 4, further comprising:
   receiving information about the first path loss, information about the second path loss, or both from the third apparatus.

8. The wireless communication method of claim 1, further comprising:
   allocating at least one first acknowledgement corresponding to the first PPDU and at least one second acknowledgement corresponding to a second PPDU to respective different radio resources, the second PPDU being transmitted by the second apparatus in the shared TXOP; and
   transmitting resource allocation information about the at least one first acknowledgement and the at least one second acknowledgement to the second apparatus.

9. The wireless communication method of claim 8, wherein allocating the at least one first acknowledgement and the at least one second acknowledgement to respective different radio resources comprises:
   allocating the at least one first acknowledgement to a first band; and
   allocating the at least one second acknowledgement to a second band that is different from the first band.

10. The wireless communication method of claim 1, further comprising:
    outputting a beacon frame comprising capability information and transmission power information, the capability information indicating support for spatial reuse and the transmission power information indicating a transmission power of the beacon frame.

11. The wireless communication method of claim 1, further comprising:
    determining a limit for a third transmission power of a fourth apparatus for sharing the TXOP with the fourth apparatus.

12. The wireless communication method of claim 11, further comprising:
    allocating a transmission of the second apparatus and a transmission of the fourth apparatus to respective different radio resources; and
    transmitting resource allocation information about the transmission of the second apparatus and the transmission of the fourth apparatus to the second apparatus and the fourth apparatus.

13. A wireless communication method performed by a second apparatus sharing a transmit opportunity (TXOP) with a first apparatus, the method comprising:
    outputting, by the second apparatus, a frame comprising a first field including capability information and a second field including first transmission power information, the capability information indicating support for spatial reuse and the first transmission power information indicating a transmission power of the frame;
    receiving, by the second apparatus, second transmission power information from the first apparatus; and
    transmitting, by the second apparatus, a physical layer protocol data unit (PPDU) in the TXOP to at least one third apparatus with a first transmission power equal to or lower than a second transmission power indicated by the second transmission power information.

14. The wireless communication method of claim 13, further comprising:
receiving apparatus identification information from the first apparatus; and
identifying the sharing of the TXOP based on the apparatus identification information.

15. The wireless communication method of claim 13, further comprising:
receiving resource allocation information about at least one acknowledgement corresponding to the PPDU from the first apparatus; and
transmitting the resource allocation information to the at least one third apparatus.

16. The wireless communication method of claim 13, further comprising:
receiving at least one second acknowledgement from the at least one third apparatus after receiving at least one first acknowledgement corresponding to the PPDU transmitted by the first apparatus in the TXOP.

17. A wireless communication method performed by a third apparatus receiving a physical layer protocol data unit (PPDU) in a transmit opportunity (TXOP) shared by a first apparatus and a second apparatus, the method comprising:
determining a first path loss between the first apparatus and the third apparatus based on a first frame received from the first apparatus;
determining a second path loss between the second apparatus and the third apparatus based on a second frame received from the second apparatus;
transmitting information about the first path loss and the second path loss to the first apparatus; and
receiving the PPDU in the TXOP from the first apparatus, wherein determining the first path loss comprises:
identifying transmission power information from a field extracted from the first frame;
measuring a reception power of the first frame; and
calculating the first path loss based on the transmission power information and the measured reception power.

18. The wireless communication method of claim 17, further comprising:
receiving resource allocation information for an acknowledgement corresponding to the PPDU from the first apparatus; and
transmitting the acknowledgement to the first apparatus based on the resource allocation information.

19. The wireless communication method of claim 18, wherein the resource allocation information indicates a frequency band for transmission of the acknowledgement.

* * * * *